US011463598B2

(12) United States Patent
Motoyama (10) Patent No.: US 11,463,598 B2
(45) Date of Patent: Oct. 4, 2022

(54) READING DEVICE READING ORIGINAL AND ESTIMATING CORNER SHAPE THEREOF

(71) Applicant: BROTHER KOGYO KABUSHIKI KAISHA, Nagoya (JP)

(72) Inventor: Toshiki Motoyama, Konan (JP)

(73) Assignee: BROTHER KOGYO KABUSHIKI KAISHA, Mizuho-ku (JP)

( * ) Notice: Subject to any disclaimer, the term of this patent is extended or adjusted under 35 U.S.C. 154(b) by 0 days.

(21) Appl. No.: 17/191,110

(22) Filed: Mar. 3, 2021

(65) Prior Publication Data

US 2021/0281699 A1 Sep. 9, 2021

(30) Foreign Application Priority Data

Mar. 6, 2020 (JP) .............................. JP2020-038665

(51) Int. Cl.
*H04N 1/00* (2006.01)

(52) U.S. Cl.
CPC ..... *H04N 1/00822* (2013.01); *H04N 1/00708* (2013.01); *H04N 1/00726* (2013.01); *H04N 1/00806* (2013.01)

(58) Field of Classification Search
CPC ........... H04N 1/00822; H04N 1/00708; H04N 1/00726; H04N 1/00806
USPC ......................................... 358/1.1–1.18, 474
See application file for complete search history.

(56) References Cited

U.S. PATENT DOCUMENTS

| 8,174,737 B2 * | 5/2012 | Kato .................... H04N 1/0071 358/474 |
| 10,331,966 B1 * | 6/2019 | Pribble .................. G06V 10/34 |
| 2013/0202185 A1 * | 8/2013 | Irwin, Jr. ............. G06Q 20/387 382/137 |
| 2017/0155792 A1 * | 6/2017 | Mizude ................ G06V 30/414 |
| 2019/0362498 A1 * | 11/2019 | Shimamura ............... G06T 7/74 |

FOREIGN PATENT DOCUMENTS

| JP | 2008-078948 A | 4/2008 |
| JP | 2014-071784 A | 4/2014 |
| JP | 2019-102898 A | 6/2019 |

* cited by examiner

*Primary Examiner* — Gabriel I Garcia
(74) *Attorney, Agent, or Firm* — Baker Botts L.L.P.

(57) ABSTRACT

A reading device includes: a reader; and a controller. The reader is configured to read both of a sheet of paper and a card as an original. The controller is, when the card having four original corners is set as the original, configured to perform for implementing a card reading function: (a) reading; and (b) acquiring. The (a) reading reads the original with the reader to acquire original image data corresponding to an original image area having four corner regions. The (b) acquiring acquires edge information of a first original corner from the original image data to estimate a round shape of the first original corner using the edge information. The first original corner being one of the four original corners in the original.

14 Claims, 6 Drawing Sheets

READING DEVICE READING ORIGINAL AND ESTIMATING CORNER SHAPE THEREOF

CROSS REFERENCE TO RELATED APPLICATION

This application claims priority from Japanese Patent Application No. 2020-038665 filed Mar. 6, 2020. The entire content of the priority application is incorporated herein by reference.

TECHNICAL FIELD

The present disclosure relates to a reading device.

BACKGROUND

Identity verification or similar processes have conventionally been conducted at various service windows and through mail correspondence or the Internet. Accordingly, there is increased demand to provide a technology for reading and copying surfaces of thick ID cards, such as a driver's license or a health insurance card.

To meet this demand, some conventional devices possessing a function to read originals have been provided with a special mode for reading both front and back surfaces of a card and outputting images of both the front surface and back surface together in a single file or to a single sheet of paper.

SUMMARY

A device that uses a flatbed system to read originals is provided with a platen glass on which an original is placed, and a reading unit movably disposed beneath the platen glass. When an original is set in an original placement area of the platen glass, the reading unit is moved under the glass to read the original. Many of these conventional flatbed reading devices do not have the capacity to read images in the leading edge portion of the original placement area (the edge of the original placement area on the side from which the reading unit begins moving.) Thus, if a card is placed on the platen glass of a flatbed reading device having these specifications so that a corner of the card is aligned with a corner of the original placement area, the image data read by this device will be missing a portion of the card since the device cannot read images in this area. Consequently, the user must arrange the card such that the corner of the card is separated from the corner of the original placement area. However, reading devices developed in recent years are being designed with the capacity to read the entire original placement area. Accordingly, these devices can read the entire surface of a card arranged on the platen glass, even when a corner of the card is aligned with a corner of the original placement area.

Since most ID cards are formed such that their four corners are rounded, such cards differ from ordinary originals having corners formed substantially at right angles. Consequently, when the card is placed on the platen glass such that a corner is aligned with a corner of the original placement area, the card original does not fill the entire corner of the original placement area. In a conventional flatbed-type device, an original cover provided for covering the back surface of the original placed on the platen glass includes a white original holding sheet on its inner surface. However, in consideration for potential play (looseness) in the original cover, this original holding sheet has been formed slightly smaller than the original placement area in order to reliably restrain the original. Therefore, when a corner of the original placement area is not entire filled by the original and the original holding sheet for providing a white background does not cover this area, the corner area will be read as black. In other words, an image represented by image data acquired by reading the card placed on the platen glass may include not only a part of the image of the card but also a part (black area in corners C1 to C4 illustrated in FIG. 8) not included in the image of the card in any of four corners.

Further, even when a device that uses an automatic document feeder system to read originals is used for reading a card, an image represented by image data acquired by the device may also include a part not included in the image of the card in any of the four corners. It should be noted that the reason why the image represented by the acquired image data includes the part not included in the image of the card is not necessarily due to the small original holding sheet.

When a black area appears in the reading results, the image data for this black area may be deleted from the scanning results if it is known that the black area is simply an area in which the original (and the white holding sheet) was not present. However, determining whether the black area was formed due to the original not being present is not an easy process. Further, since there are various shapes of rounded corners depending on the type of card, the shape of the corners cannot be determined in advance.

In view of the foregoing, it is an object of the present disclosure to provide a reading device capable of estimating the corner shape of an original.

In order to attain the above and other objects, the present disclosure provides a reading device including a reader; and a controller. The reader is configured to read both of a sheet of paper and a card as an original. The controller is, when the card having four original corners is set as the original, configured to perform for implementing a card reading function: (a) reading; and (b) acquiring. The (a) reading reads the original with the reader to acquire original image data corresponding to an original image area having four corner regions. The (b) acquiring acquires edge information of a first original corner from the original image data to estimate a round shape of the first original corner using the edge information. The first original corner is one of the four original corners in the original.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Next, an embodiment of the present disclosure will be described in detail while referring to the accompanying drawings.

<Structure of a Reading Device>

Figure 1:
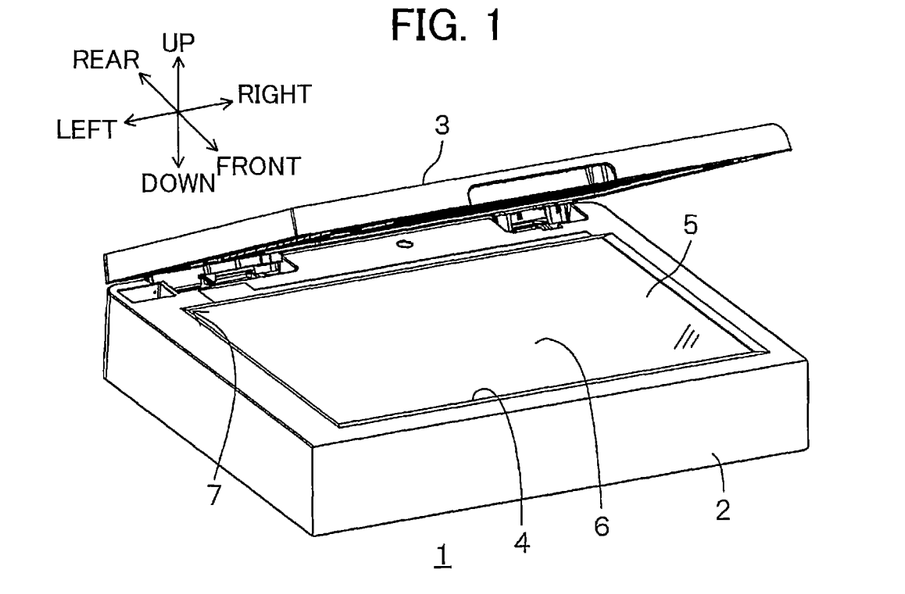
FIG. 1 illustrates a perspective view of a reading device according to one embodiment of the present disclosure.

FIG. 1 illustrates a reading device 1 that can read originals according to a flatbed method. The reading device 1 may be provided in a multifunction peripheral (MFP) that includes a printing device (not illustrated) for printing images on paper based on image data and that has a plurality of functions including a reading function and a printing function. In this case, the reading device 1 is disposed on top of the printing device.

The reading device 1 includes a casing 2 that is substantially rectangular parallelepiped in shape, and a cover 3 that opens and closes over the top surface of the casing 2. The cover 3 is provided so as to be pivotable about an axis extending along one edge of the casing 2. The cover 3 can pivot between an open position in which the cover 3 is raised upward from the top surface of the casing 2 to expose the top surface, and a closed position in which the cover 3 is laid down over the top surface of the casing 2 for covering the top surface.

In the reading device 1 according to the present embodiment, the side on which the pivot axis of the cover 3 is set will be the rear surface side, while the opposite side will be the front surface side. Front, rear, left, and right directions used in the following description will be defined on the basis of the perspective of a user facing the front side of the reading device 1. These directions, as well as up and down directions, are indicated by arrows in FIGS. 1, 2, and 3.

A rectangular opening 4 is formed in the top surface of the casing 2, and the opening 4 has edges extending in the front-rear direction and left-right direction. A platen glass 5 (an example of the platen of the present disclosure) configured of a clear glass plate is disposed inside the casing 2 so as to close the opening 4 from the bottom. The circumferential edges of the platen glass 5 are set into and supported by the portion of the casing 2 around the periphery of the opening 4. The top surface of the platen glass 5 is flat and constitutes an original placement surface 6 on which is placed an original to be read, such as an ID card CA. The rectangular region of the original placement surface 6 that is exposed through the opening 4 is defined as an original placement area. The original is arranged on the original placement surface 6 with one corner of the original aligned with a left-rear corner 7 formed by the intersection of the left edge and the rear edge of the opening 4 so that the original contacts the left and rear edges of the opening 4.

Figure 2:
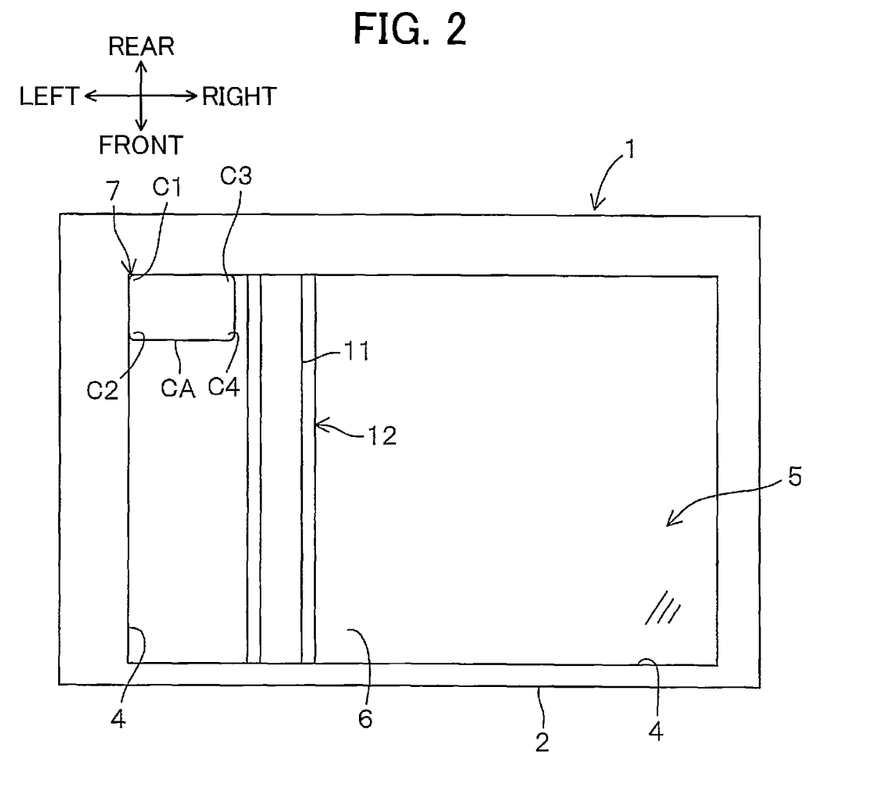
FIG. 2 illustrates a top surface of a casing of the reading device according to the embodiment of the present disclosure.
Figure 3:
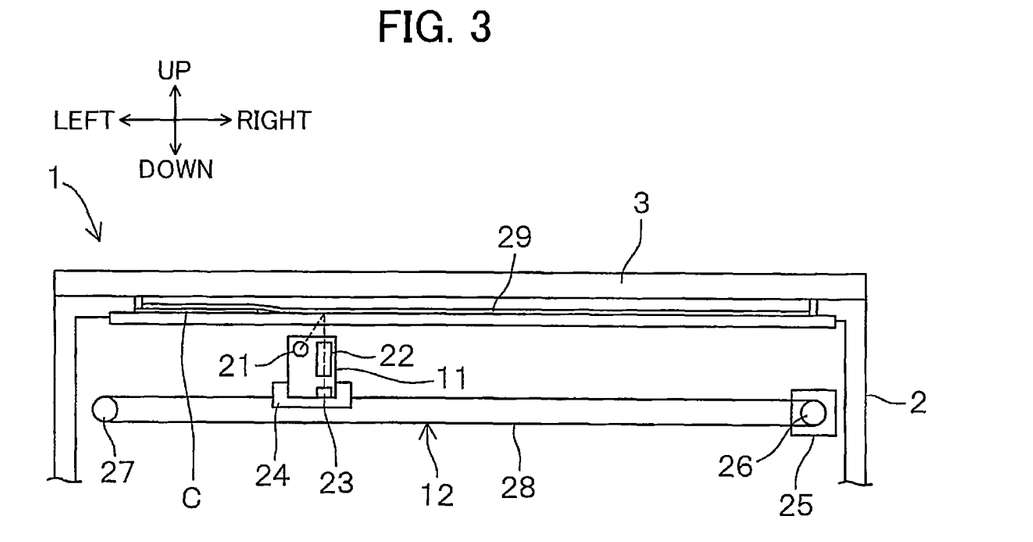
FIG. 3 illustrates a schematic sectional view of the reading device according to the embodiment of the present disclosure.

As illustrated in FIGS. 2 and 3, a contact image sensor unit 11 (an example of the reader of the present disclosure) and a reciprocating mechanism 12 are provided below the platen glass 5. Hereinafter, the contact image sensor unit will be abbreviated as "CIS unit".

As illustrated in FIG. 3, the CIS unit 11 houses a light source 21, a rod lens array 22, and an image sensor 23. The light source 21 is provided for irradiating light toward the platen glass 5. The irradiated light is in the form of a line extending in the front-rear direction. The image sensor 23 is a linear image sensor, for example, that is configured with a plurality of light-receiving elements arrayed in a main scanning direction. The image sensor 23 is disposed so that the main scanning direction is aligned with the front-rear direction.

Light from the light source 21 is reflected off the surface of the original or other reading target on the platen glass 5, and the reflected light passes through the rod lens array 22 and is incident on the image sensor 23. When light is incident on the image sensor 23, each light-receiving element of the image sensor 23 outputs a voltage through photoelectric conversion. The voltages outputted from the light-receiving elements are first amplified by a gain control circuit and subsequently converted to digital pixel values by an A/D converter circuit. The A/D converter circuit has a resolution of 8 bits (0-255), for example. The A/D converter circuit converts all voltages less than a lower limit reference voltage (lower limit value) to "0", converts all voltages greater than an upper limit reference voltage (upper limit value) to "255", and converts voltages between the lower limit value and upper limit value to a pixel value corresponding to the magnitude of the voltage. Through this process, the CIS unit 11 reads one line worth of the reading target along the main scanning direction.

The reciprocating mechanism 12 reciprocates the CIS unit 11 in a sub scanning direction orthogonal to the main scanning direction. The reciprocating mechanism 12 is provided with a carriage 24 that supports the CIS unit 11, a stepping motor 25 that can rotate in forward and reverse directions, a drive pulley 26 that is driven to rotate by the stepping motor 25, a follow pulley 27 that forms a pair with the drive pulley 26, and a belt 28 that is looped around the drive pulley 26 and follow pulley 27. The drive pulley 26 is disposed inside the casing 2 near the right side thereof with its rotational axis aligned in the front-rear direction. The follow pulley 27 is disposed inside the casing 2 near the left side thereof with its rotational axis aligned in the front-rear direction at the same height as the rotational axis of the drive pulley 26. The carriage 24 is attached to the belt 28 and moves together with the belt 28 as the belt 28 is circulated by the rotation of the drive pulley 26. At this time, the carriage 24 is guided along a guide mechanism (not illustrated) so as to be reciprocated in the sub scanning direction, i.e., the left-right direction.

In order to read an original, the user rotates the cover 3 into the open position and places the original in the original placement area of the platen glass 5. Once the original has been positioned on the platen glass 5, the user closes the cover 3 so that the cover 3 covers the back surface of the original from above. As illustrated in FIG. 3, an original retainer 29 is elastically supported on the inner surface of the cover 3. The original retainer 29 is formed of a white sheet-like resin material. The original retainer 29 has a rectangular shape that is slightly smaller in size than the opening 4. When the cover 3 is closed, the original retainer 29 does not come to rest on top of the peripheral edges of the opening 4 formed in the casing 2 but is positioned inside the opening 4 with a gap separating the edges of the original retainer 29 from the peripheral edges of the opening 4 (the peripheral edges of the original placement area) and presses the original against the platen glass 5.

After arranging the original on the platen glass 5, the user inputs a command into the reading device 1 to start a reading operation. In response, the reciprocating mechanism 12 begins moving the CIS unit 11 from the left side to the right side along the sub scanning direction while the CIS unit 11 reads one line at a time from the original in synchronization with this movement.

<Electrical Configuration of the Reading Device>

Figure 4:
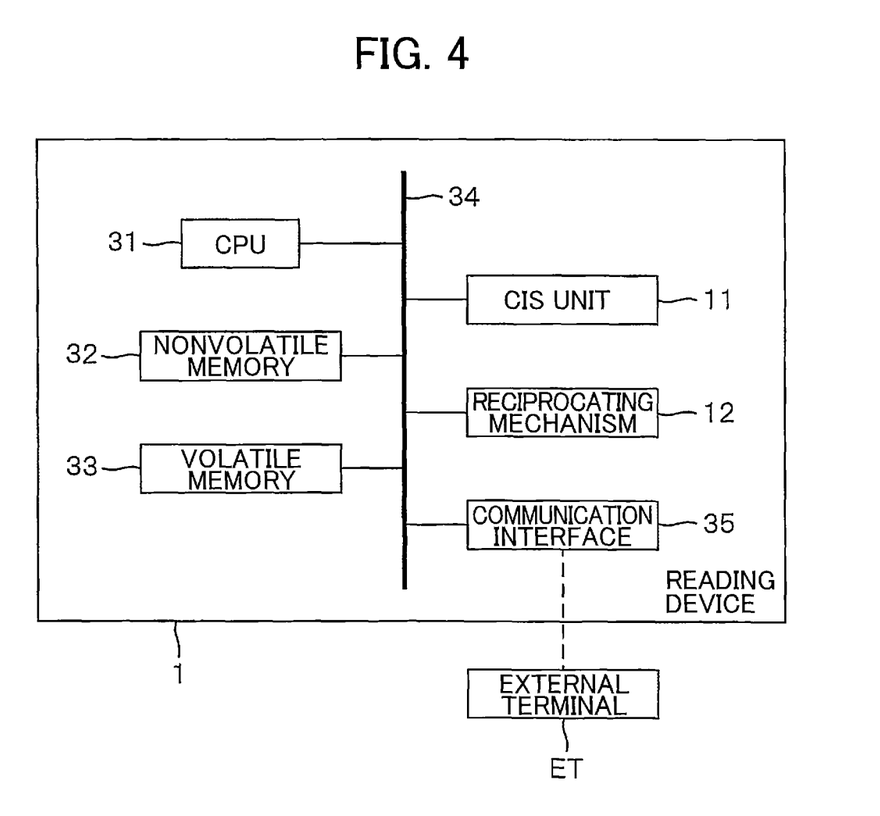
FIG. 4 is a block diagram illustrating an electrical configuration of the reading device according to the embodiment of the present disclosure.

As illustrated in FIG. 4, the reading device 1 is provided with a central processing unit (CPU) 31, a nonvolatile memory 32 such as a flash memory or an E²PROM to which data is writable, and a volatile memory 33 such as a SDRAM. The CPU 31, nonvolatile memory 32, and volatile memory 33 are interconnected via a bus 34 that allows data communications.

By executing a program to perform various processes, the CPU 31 (an example of the controller of the present disclosure) controls components of the reading device 1 including the CIS unit 11 and reciprocating mechanism 12. The nonvolatile memory 32 stores programs executed by the CPU 31, various data, and the like. The volatile memory 33 is used as a work area when the CPU 31 executes programs.

The reading device 1 is also provided with a communication interface 35 for communicating with an external terminal ET, such as a personal computer (PC). The communication interface 35 is also connected to the bus 34. The communication interface 35 may be configured to communicate with the external terminal ET via wires, such as Universal Serial Bus (USB) cable or a local area network (LAN) cable or may be configured to communicate with the external terminal ET wirelessly through radio waves or the like.

<ID Card Reading Process>

The reading device 1 has an ID card reading function. When the original targeted for reading is an ID card CA, such as a driver's license or a health insurance card for example, the ID card reading function serves to read both front and back surfaces of the ID card CA and to output image data for each of the front and back surfaces. The option to use the ID card reading function may be selected and set through an operation on the external terminal ET, for example. Further, the reading device 1 may be provided with a user interface, and the option to use the ID card reading function may be selected and set through an operation on the user interface. Alternatively, if a command to read an original was received and the original is the size of an ID card, the reading device 1 may determine that the target original is an ID card CA and may read both front and back surfaces and output image data for each surface, even if the option to use the ID card reading function was not selected.

To read an ID card CA on the reading device 1, the user places the ID card CA on the platen glass 5, closes the cover 3, and subsequently issues a command to execute a reading operation on the original (the ID card CA). At this time, the reading device 1 begins the reading process illustrated in FIGS. 5A and 5B. In S11 at the beginning of the reading process, the CPU 31 controls the CIS unit 11 and reciprocating mechanism 12 to read a first surface of the ID card CA. Here, the first surface is the surface of the ID card CA in contact with the platen glass 5 (the front surface).

Figure 5A:
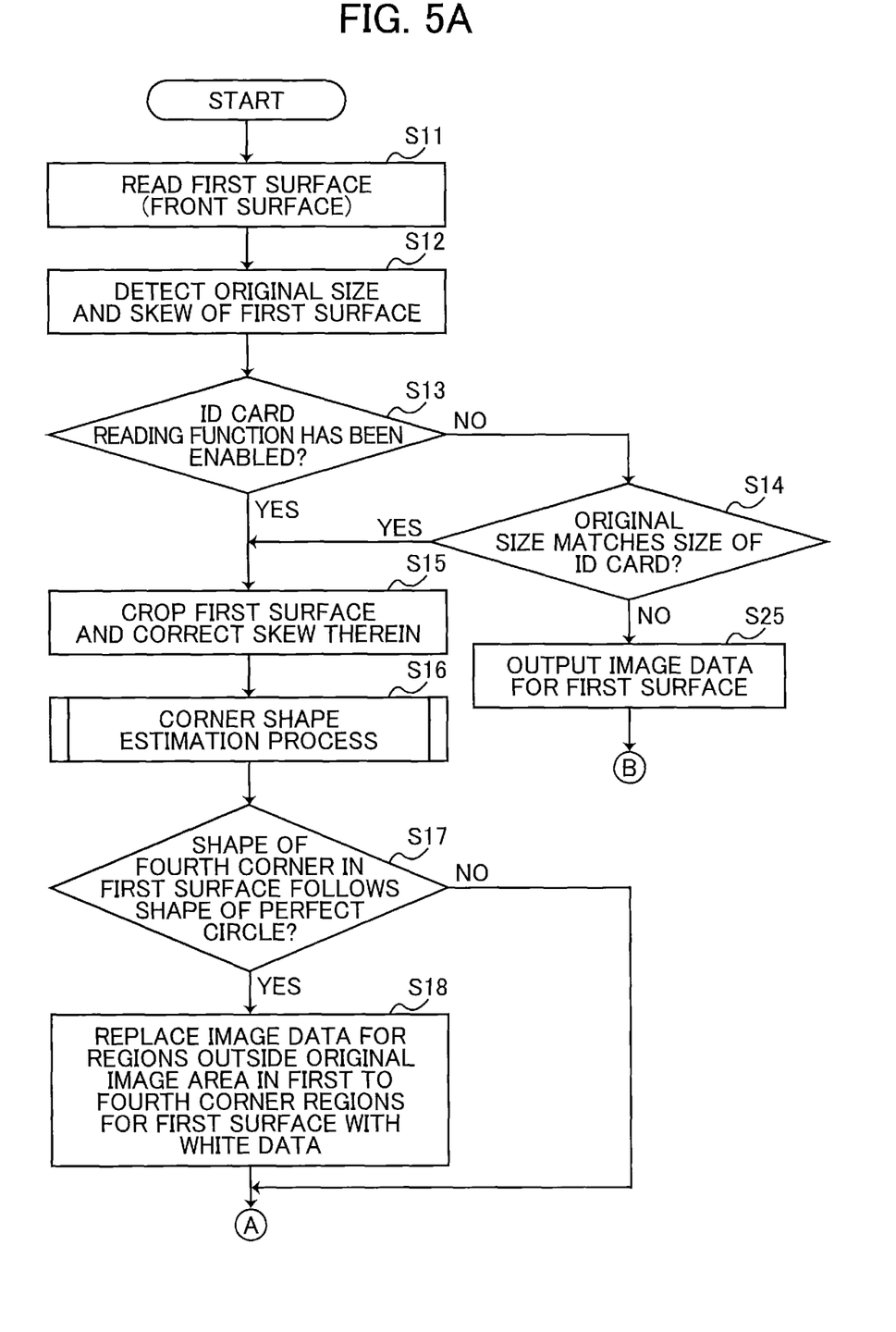
FIG. 5A is a flowchart illustrating part of steps in a reading process executed by a CPU of the reading device according to the embodiment of the present disclosure.

In S12 the CPU 31 detects the original size and skew of the first surface according to image data acquired by reading the first surface.

To find the original size, the CPU 31 extracts edge information for the first surface by processing the image data using a Sobel filter, extracts information for the front and rear edges (opposing edges in the main scanning direction) from this edge information, and determines the dimension of the first surface in the main scanning direction from the edge information for the front and rear edges. Similarly, the CPU 31 extracts information for the left and right edges (opposing edges in the sub scanning direction) from the edge information for the first surface and determines the dimension of the first surface in the sub scanning direction from the edge information for the left and right edges.

To find the skew, the CPU 31 extracts edge information for the first surface by performing a process on the image data using a Sobel filter, for example, and further extracts information for a straight segment of the left edge (the edge on the upstream side in the sub scanning direction) from this edge information. Next, the CPU 31 finds the acute angle that this straight segment forms with the main scanning direction from the information extracted for the straight segment and detects this acute angle to be the skew in the first surface.

In S13 the CPU 31 determines whether the ID card reading function has been enabled.

If the ID card reading function has not been enabled (S13: NO), in S14 the CPU 31 determines whether the size of the original (the dimensions of the original in the main scanning direction and the sub scanning direction) are the size of an ID card. In the present embodiment, a range of the size has been set and stored in the nonvolatile memory 32 as an ID card size range in advance. If the size of the original falls within the ID card size range, in S14 the CPU 31 determines that the original size matches the size of an ID card (S14: YES). Note that a plurality of ranges may be set as the ID card size range. In this case, the CPU 31 determines that the original size matches the size of an ID card when the size of the original falls within any one of the ranges stored in the nonvolatile memory 32.

When the original size is not the size of an ID card (S14: NO), in S25 the CPU 31 outputs image data for the first surface, and subsequently ends the reading process. Here, outputting the image data in S25 and S24 to be described later may be a process of transmitting the image data to the external terminal ET or a process of printing the image data on a printing device when the reading device 1 is integrally provided with the printing device.

On the other hand, if the ID card reading function has been enabled (S13: YES) or if the ID card reading function has not been enabled (S13: NO) but the size of the original matches the size of an ID card (S14: YES), in S15 the CPU 31 detects skew in the first surface, crops the first surface of the ID card CA from the image data, and corrects the rotation of the cropped image data according to the angle of skew detected in the first surface.

In S16 the CPU 31 executes a corner shape estimation process. When the ID card CA has been formed with four rounded corners, the corner shape estimation process is performed to estimate the shape of a fourth corner C4 (rounded shape) for the first surface of the ID card CA. As illustrated in FIG. 2, the fourth corner C4 of the first surface is the corner diagonally opposite from a first corner C1 of the ID card CA aligned with the left-rear corner 7 of the original placement area when the first surface was read. The fourth corner C4 of the first surface is an example of the first original corner of the present disclosure, and the first corner C1 of the first surface is an example of the second original corner of the present disclosure.

Figure 6:
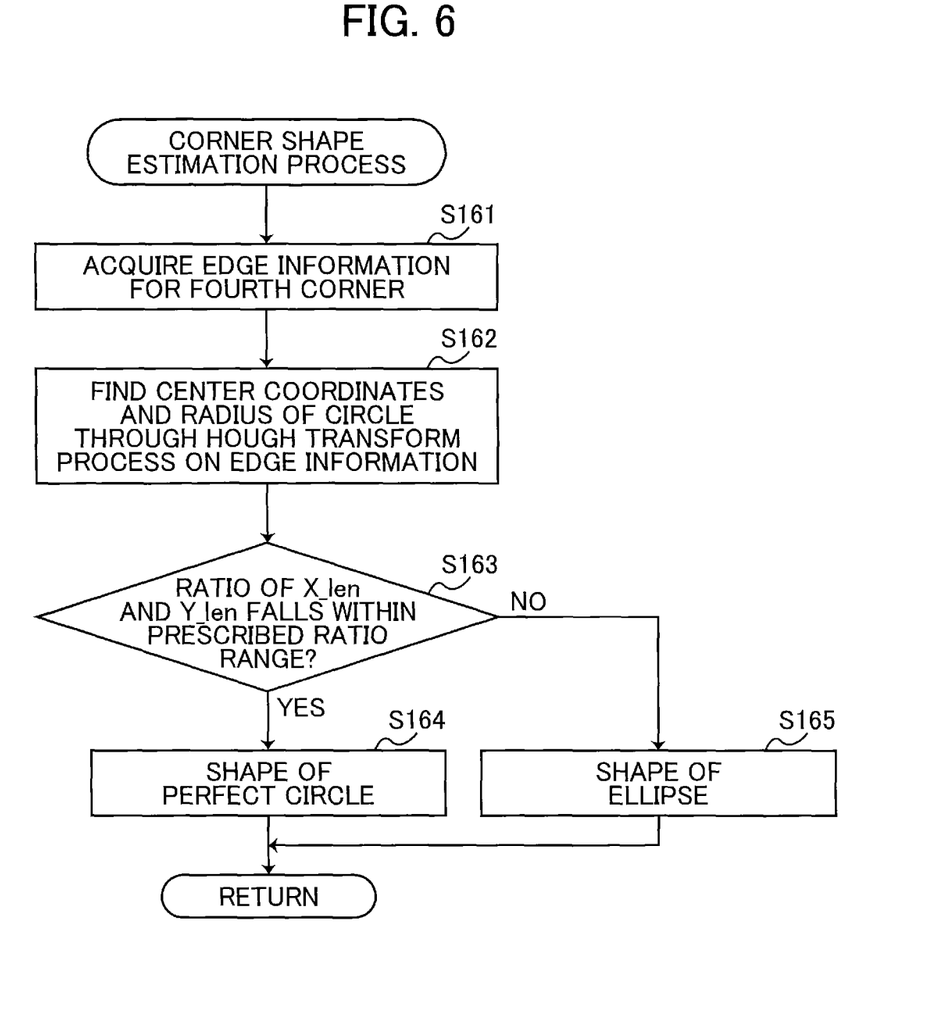
FIG. 6 is a flowchart illustrating steps in a corner shape estimation process executed by the CPU of the reading device according to the embodiment of the present disclosure.

FIG. 6 illustrates steps in the corner shape estimation process.

In S161 of the corner shape estimation process, the CPU 31 acquires edge information for the fourth corner C4 from the image data for the first surface of the ID card CA. The image data for the first surface includes image data for a corner region that contains the fourth corner C4. This corner region includes an original image area read from the fourth corner C4, and an area read from the original retainer 29. The area enclosed between the rounded outline of the fourth corner C4 and straight imaginary lines that extend from the two sides of the ID card CA in this corner region (front and rear sides in this example) and intersect at a right angle can be assumed to be the area read from the original retainer 29. Hence, the edge information for the fourth corner C4 is determined to be information for the border between the fourth corner C4 and original retainer 29.

Figure 7:
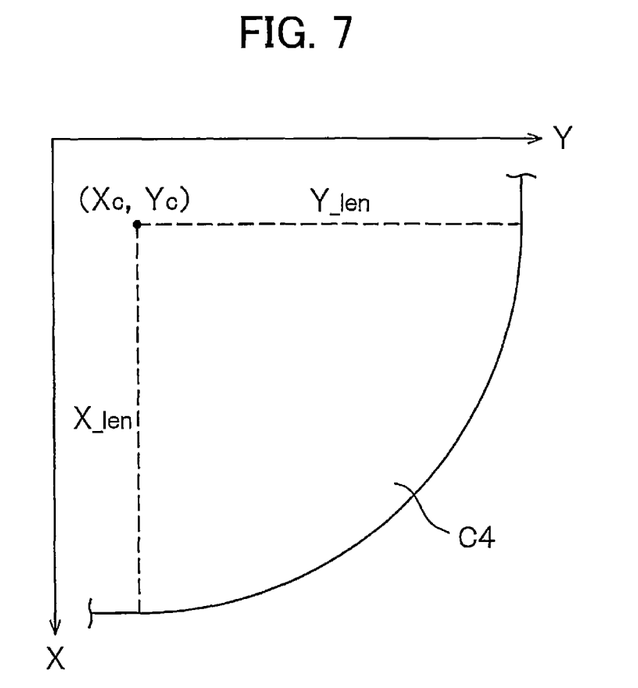
FIG. 7 is an explanatory diagram illustrating an example of center coordinates, a corner radius along an X-axis, and a corner radius along a Y-axis of a rounded shape of a fourth corner of an ID card read by the reading device.

In S162 the CPU 31 executes a Hough transform process on the edge information for the fourth corner C4 in order to find center coordinates (Xc, Yc) of a circle including the rounded corner shape of the fourth corner C4. As illustrated in FIG. 7, the main scanning direction constitutes the X-axis and the sub scanning direction constitutes the Y-axis. The direction from the rear side toward the front side in the main scanning direction is the positive direction of the X-axis, and the direction from the left side toward the right side in the sub scanning direction is the positive direction of the Y-axis. Additionally, in S162 the CPU 31 finds a corner radius X_len from the center coordinates (Xc, Ye) to the edge of the fourth corner C4 along the X-axis and a corner radius Y_len from the center coordinates (Xc, Ye) to the edge of the fourth corner C4 along the Y-axis.

In S163 the CPU 31 compares the corner radius X_len along the X-axis to the corner radius Y_len along the Y-axis and determines whether the ratio of the corner radius X_len and corner radius Y_len falls within a prescribed ratio range. In the present embodiment, the prescribed ratio range is set to a range of 0.67 to 1.5. When the ratio of the corner radius X_len and corner radius Y_len is within the prescribed range, that is, greater than or equal to 0.67 and less than or equal to 1.5 (S163: YES), in S164 the CPU 31 estimates that the rounded shape of the fourth corner C4 follows the shape of a perfect circle, and subsequently ends the corner shape estimation process. However, if the ratio of the corner radius X_len and corner radius Y_len is out of the prescribed range, that is, less than 0.67 or greater than 1.5 (S163: NO), in S165 the CPU 31 estimates that the rounded shape of the fourth corner C4 follows the shape of an ellipse, and subsequently ends the corner shape estimation process. After completing the corner shape estimation process, the CPU 31 returns to the reading process in FIG. 5A and resumes the process from S17.

After estimating the rounded shape of the fourth corner C4, in S17 the CPU 31 determines whether the rounded shape of the fourth corner C4 is the shape of a perfect circle.

Figure 8:
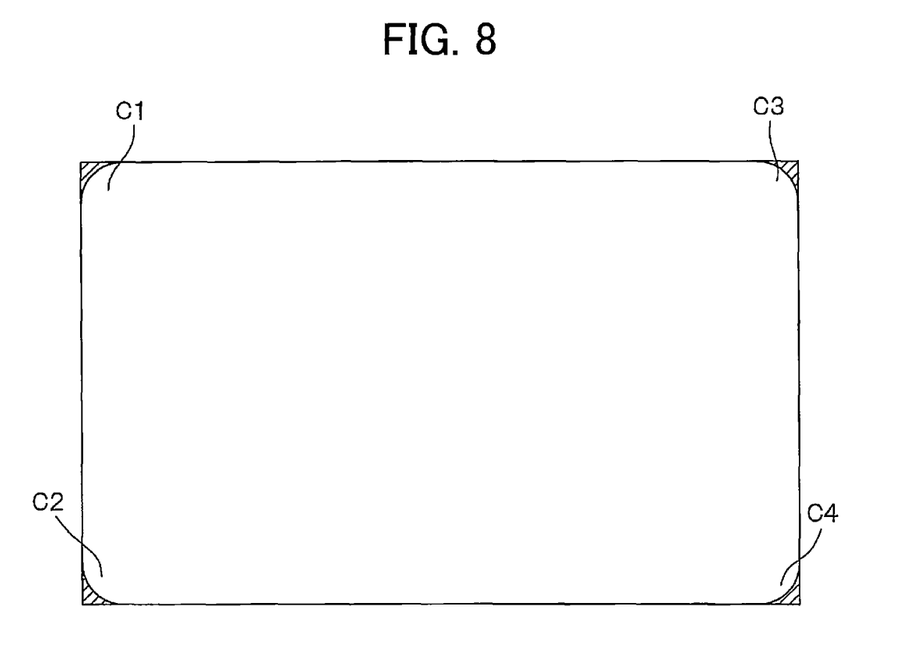
FIG. 8 is an explanatory diagram illustrating an image of a first surface of the ID card read by the reading device.

When the CPU 31 estimates that the rounded shape of the fourth corner C4 follows the shape of a perfect circle (S17: YES), in S18 the CPU 31 divides the corner region that includes the fourth corner C4 (a rectangular region having two sides configured of extension line segments that extend from the two sides defining the fourth corner C4 to a point at which the extension lines intersect) into two areas on either side of the rounded outline of the fourth corner, as illustrated in FIG. 8. Of these two areas, the CPU 31 determines that the area on the side of the fourth corner C4 nearest the first corner C1 positioned diagonally opposite the fourth corner C4 is an area inside the original image area, and determines that the area on the opposite side is an area outside the original image area corresponding to the original retainer 29. Further, the CPU 31 applies the rounded outline of the fourth corner C4 to estimate the rounded shape of each of the first corner C1, a second corner C2, and a third corner C3 as following the shape of a perfect circle. Here, the CPU 31 divides the corner region that includes the first corner C1 in the image data for the first surface into two areas by applying the rounded shape of the fourth corner C4, determines that the area on the side of the first corner C1 positioned nearest the fourth corner C4 is an area inside the original image area, and determines that the area on the opposite side of the first corner C1 is an area outside the original image area. The CPU 31 performs a similar process on a corner region including the second corner C2 and a corner region including the third corner C3 to divide the corner region into an area inside the original image area and an area outside the original image area. Next, the CPU 31 replaces image data for the region outside the original image area in each corner region with white data.

Note that regions outside the original image area are indicated with shading in FIG. 8.

On the other hand, if the CPU 31 did not estimate that the rounded shape of the fourth corner C4 follows a perfect circle (S17: NO), i.e., when the CPU 31 estimated that the rounded shape of the fourth corner C4 follows an elliptical shape, the CPU 31 skips S18 and does not perform the process to divide each corner region into an area inside the original image area and an area outside the original image area and to replace image data for areas outside the original image area with white data.

Thereafter, provided that the ID card reading function has been enabled or that the size of the original read above is the size of an ID card, the CPU 31 displays a message on the display screen of the external terminal ET prompting the user to set the next original. Specifically, the CPU 31 displays a guidance screen including a message instructing the user to turn over the ID card CA and reposition the ID card CA on the platen glass 5 and to input a command to execute a scan of the back surface of the ID card CA.

Figure 5B:
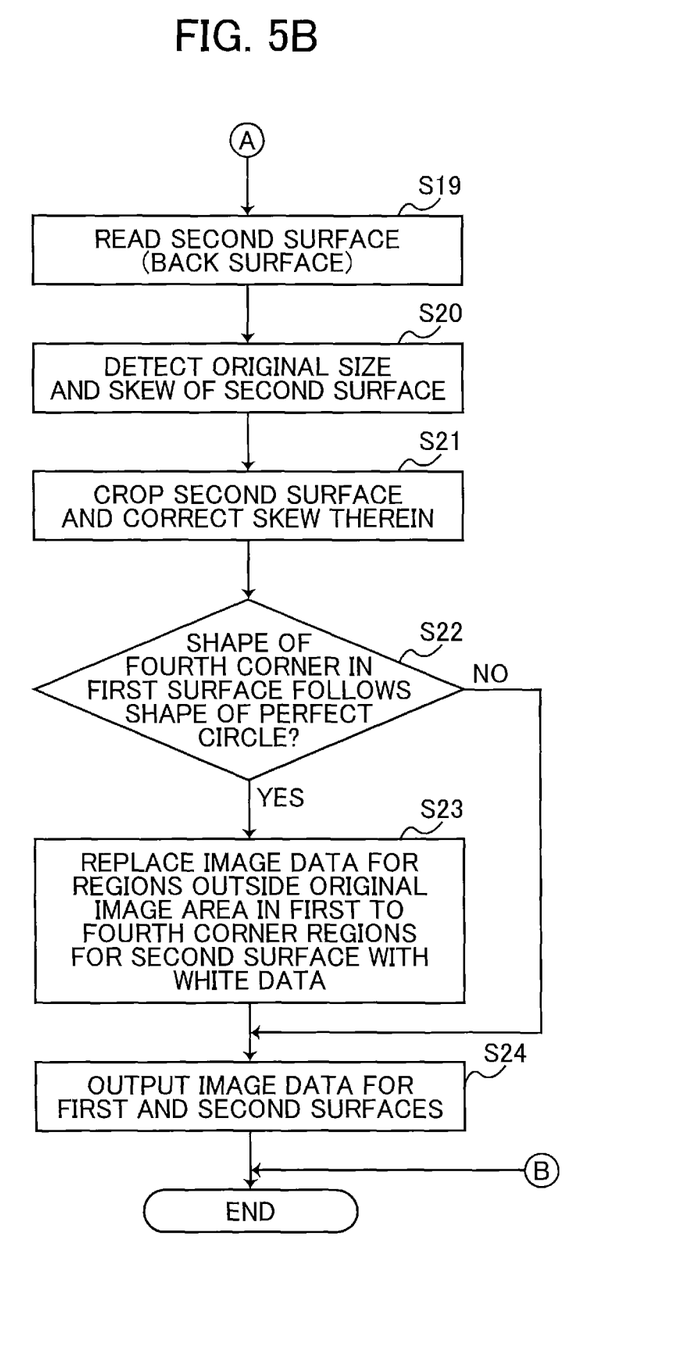
FIG. 5B is a flowchart illustrating remaining part of steps in the reading process executed by the CPU of the reading device according to the embodiment of the present disclosure.

When a command to execute a scan is issued, in S19 of FIG. 5B the CPU 31 controls the CIS unit 11 and reciprocating mechanism 12 to execute a reading operation on a second surface (back surface) of the ID card CA that is in contact with the platen glass 5.

In S20 the CPU 31 detects skew in the second surface and the size of the original from image data acquired when reading the second surface. The method of detecting skew in the second surface is identical to the method of detecting skew in the first surface. The method of detecting the size of the original is also the same method described earlier.

In S21 the CPU 31 crops the second surface of the ID card CA from the image data and corrects the rotation of the cropped image data according to the angle of skew in the second surface.

In S22 the CPU 31 determines whether the rounded shape of the fourth corner C4 in the first surface was estimated to follow the shape of a perfect circle in the corner shape estimation process performed earlier.

If the rounded shape of the fourth corner C4 was estimated to follow a perfect circle (S22: YES), in S23 the CPU 31 applies the rounded shape of the fourth corner C4 to an estimation of the rounded shape for each of the four corners of the second surface in the image data for the second surface of the ID card CA and estimates that the rounded corners of the second surface all follow perfect circles. In the image data for the second surface, the CPU 31 divides each corner region that includes an individual corner into two areas divided by the rounded shape of the corner included in the corresponding corner region, determines that the area on the side of the corner nearest the opposing corner is an area inside the original image area, and determines that the area on the opposite side is an area outside the original image area. Next, the CPU 31 replaces image data for the area outside the original image area in each corner region with white data.

In S24 the CPU 31 outputs image data for the first and second surfaces and subsequently ends the reading process.

Further, if the CPU 31 determines in S22 that the rounded shape of the fourth corner for the first surface does not follow a perfect circle (S22: NO), i.e., when the CPU 31 estimated that the rounded shape of the fourth corner C4 follows an elliptical shape, the CPU 31 skips S23 and does not perform the process to divide each corner region into an area inside the original image area and an area outside the original image area and to replace image data for areas outside the original image area with white data. Thereafter, in S24 the CPU 31 outputs image data for the first and second surfaces and subsequently ends the reading process.

In the above process, the user performs operations on the external terminal ET to indicate whether or not to enable the ID card reading function and to issue a command to execute a reading operation. However, if the reading device 1 is provided with an operating unit having a touchscreen or the like, the user may perform these settings or commands through operations on the operating unit.

<Effects of the Embodiment>

As described above, if the CPU 31 determines that the ID card reading function has been enabled or determines that the original is the size of an ID card when scanning an original, the CPU 31 estimates the rounded shape of the fourth corner C4 for the first surface of the ID card CA on the assumption that the original being read is an ID card CA.

In the corner shape estimation process performed to estimate the rounded shape of a corner, the CPU 31 acquires edge information for the fourth corner C4 from image data that is included in the image data of the first surface of the ID card CA and corresponds to a corner region including the fourth corner C4, and estimates the rounded shape of the fourth corner C4 from this edge information. In the image data of the first surface, the corner region that includes the fourth corner C4 includes an original image area having image data corresponding to the fourth corner C4, and an area corresponding to the original retainer 29. The area enclosed between extended lines from the two sides of the ID card CA defining the fourth corner C4 of the first surface and the rounded outline of the fourth corner C4 is the area corresponding to the original retainer 29. Therefore, the reading device 1 can acquire edge information for the fourth corner C4 from image data for the first surface of the ID card CA and can estimate the rounded shape of the fourth corner C4 in the first surface from this edge information.

Also in the corner shape estimation process, the CPU 31 finds the center coordinates (Xc, Yc) for the rounded shape of the fourth corner C4 in the first surface, the corner radius X_len from the center coordinates (Xc, Yc) to the edge of the fourth corner C4 along the X-axis, and the center radius Y_len from the center coordinates (Xc, Yc) to the edge of the fourth corner C4 along the Y-axis. Subsequently, the CPU 31 compares the corner radius X_len along the X-axis and the corner radius Y_len along the Y-axis to determine whether the rounded shape of the fourth corner C4 follows the shape of a perfect circle or the shape of an ellipse.

When the rounded shape of the fourth corner C4 forms a portion of a perfect circle, the CPU 31 applies the rounded shape of the fourth corner C4 to the rounded shapes of the second corner C2, first corner C1, and third corner C3 by rotating the shape in units of 90 degrees. The CPU 31 similarly applies the rounded shape of the fourth corner C4 from the first surface to the rounded shapes of the four corners in the second surface. In the image data for each of the first surface and second surface, the CPU 31 separates the corner region containing each individual corner into two areas divided by the rounded outline of the corner included in the respective corner region, determines that the area on the side of the rounded outline of the corner nearest the opposing corner is an area inside the original image area and that the area on the opposite side of the dividing rounded corner is an area outside the original image area.

Next, the CPU 31 replaces the image data in the area of each corner region outside the original image area with white data. In this way, the reading device 1 can obtain reading results with no black parts in the corners, even when reading an ID card CA whose first corner C1 is aligned with the left-rear corner 7 of the original placement area.

Further, if the CPU 31 determines that the rounded shape of the fourth corner C4 in the first surface follows an elliptical shape rather than a perfect circle, the CPU 31 does not perform a process to divide each corner region into an area inside the original image area and an area outside the original image area or to replace image data for areas outside the original image area with white data. In this way, the reading device 1 can avoid the loss of data representing the original when replacing portions of image data read from the original with white data.

Variations of the Embodiment

While the description has been made in detail with reference to specific embodiments, it would be apparent to those skilled in the art that various changes and modifications may be made thereto.

In the embodiment described above, the reading device 1 uses a flatbed system to read an original placed on the platen glass 5. However, the reading device may be provided with a document tray and an automatic document feeder, and may use an automatic document feeder system. In the automatic document feeder system, the originals are placed on the document tray in a stacked state and fed therefrom one by one onto a conveying path. While being conveyed along the conveying path, the original passes over a contact glass. At this time, the CIS unit 11 disposed beneath the contact glass reads the original. This reading device is also provided with a sensor for detecting a size of each original placed on the document tray. The CPU 31 determines whether the size of the original matches the size of an ID card, and reads the original as shown in steps following S15 in FIG. 5A when the original is determined to be an ID card.

When the document tray is set to the size of an ID card in the reading device equipped with the automatic document feeder, the reading range of the CIS unit 11 is roughly fixed. Thus, the CPU 31 reads the original as shown in steps following S15 in FIG. 5A when the document tray is set to the size of an ID card, or when the reading range of the CIS unit 11 corresponds to the size of an ID card.

The document tray described above may be provided with a card placement section for disposing an ID card, such as a card slot. In this case, the CPU 31 reads the original as shown in steps following S15 in FIG. 5A when the original is placed in the card placement section.

In the embodiment described above, the CPU 31 executes all of the processes. However, the reading device 1 may be provided with a plurality of CPUs 31 that work in concert to execute these processes. Further, if the ratio of the corner radius X_len along the X-axis and the corner radius Y_len along the Y-axis is close to 1 (one), the average value rather than the actual shape may be applied to all corners as a shape possessing a simple radius R.

It would be apparent to those skilled in the art that many modifications and variations may be made in the configuration described above without departing from the scope of which is defined by the attached claims.

What is claimed is:

1. A reading device comprising:
a reader configured to read both of a sheet of paper and a card as an original, the original being disposed on an original placement surface in which a rectangular region is defined as an original placement area, the reader being configured to read the original while moving in a moving direction parallel to the original placement surface;
an original retainer configured to press the original against the original placement surface; and
a controller, when the card having four original corners is set as the original, configured to perform for implementing a card reading function:
(a) reading the original with the reader to acquire original image data corresponding to an original image area having four corner regions, the four original corners including a first original corner and a second original corner diagonally opposite from the first original corner, the original being arranged in the original placement area with the second original corner aligned with one area corner of the original placement area; and
(b) acquiring edge information of the first original corner from the original image data to estimate a round shape of the first original corner using the edge information;
wherein the (a) reading reads the original to acquire the original image data corresponding to the original placement area while the original retainer is pressing the original.

2. The reading device according to claim 1, further comprising:
a platen having the original placement surface, the reader being disposed on an opposite side to the original placement surface with respect to the platen,
the original retainer being provided on a same side as the original placement surface with respect to the platen.

3. The reading device according to claim 1, wherein the (b) acquiring comprises:
(b1) calculating a corner radius of the rounded shape of the first original corner using the edge information; and
(b2) estimating the rounded shape of the first original corner based on the corner radius.

4. A reading device comprising:
a reader configured to read both of a sheet of paper and a card as an original; and
a controller, when the card having four original corners is set as the original, configured to perform for implementing a card reading function:
(a) determining whether the original is the card based on a size of the original;
(b) selecting whether to enable or disable the card reading function in accordance with a determination result in (a), wherein the (b) selecting selects to enable the card reading function in response to determining that the original is the card in (a);
(c) reading, in response to selecting to enable the card reading function in (b), the original with the reader to acquire original image data corresponding to an original image area having four corner regions; and
(d) acquiring edge information of a first original corner from the original image data to estimate a round shape of the first original corner using the edge information, the first original corner being one of the four original corners in the original.

5. The reading device according to claim 4, wherein the (a) determining determines that the original is the card when the size of the original falls within a predetermined range of a card size.

6. The reading device according to claim 4, wherein the controller is configured to further perform:
(e) receiving an instruction to enable the card reading function, and
wherein the (b) selecting selects to enable the card reading function in response to receiving the selection of the card reading function in (e).

7. A reading device comprising:
a reader configured to read both of a sheet of paper and a card as an original; and
a controller, when the card having four original corners is set as the original, configured to perform for implementing a card reading function:
(a) reading the original with the reader to acquire original image data corresponding to an original image area having four corner regions; and
(b) acquiring edge information of a first original corner from the original image data to estimate a round shape of the first original corner using the edge information, the first original corner being one of the four original corners in the original,
wherein the four original corners in the original further include a second original corner diagonally opposite from the first original corner, the four corner regions of the original image area include a first corner region containing the first original corner and a second corner region containing the second original corner, and the original image data includes corner image data corresponding to the first corner region, and
wherein the (b) acquiring comprises:
(b1) dividing the first corner region into an inside area and an outside area with a border, the inside area being positioned on a same side as the second corner region with respect to the border between the inside area and the outside area, the outside area being positioned on an opposite side to the second corner region with respect to the border;
(b2) acquiring the edge information indicating a shape of the border; and
(b3) estimating the rounded shape of the first original corner using the acquired edge information.

8. A reading device comprising:
a reader configured to read both of a sheet of paper and a card as an original; and
a controller, when the card having four original corners is set as the original, configured to perform for implementing a card reading function:
(a) reading the original with the reader to acquire original image data corresponding to an original image area having four corner regions;
(b) acquiring edge information of a first original corner from the original image data to estimate a round shape of the first original corner using the edge information, the first original corner being one of the four original corners in the original; and (c) determining an original area in which the original is present based on the rounded shape of the first original corner.

9. The reading device according to claim 8, wherein the four original corners in the original further includes a second original corner, a third original corner and a fourth original corner, the second original corner being diagonally opposite from the first original corner, the fourth original corner being diagonally opposite from the third original corner, wherein the (c) determining comprises:
(c1) applying the rounded shape of the first original corner to estimate a rounded shape of each of the second original corner, the third original corer, and the fourth original corner; and
(c2) determining the original area based on the rounded shape of each of the first original corner, the second original corner, the third original corner, and the fourth original corner.

10. The reading device according to claim 9, wherein each of the four corner regions of the original image area contains an individual original corner, wherein the (c1) applying divides each of the four corner regions into an inside area and an outside area with a border having the rounded shape of the first original corner, the inside area in one corner region containing one original corner being positioned on a same side as another original corner with respect to the border, the another original corner being positioned diagonally opposite from the one original corner, the outside area in the one corner region being positioned on an opposite side to the another original corner with respect to the border, and wherein the (c2) determining determines the original area by including the inside area determined for each of the four corner regions and excluding the outside area determined for each of the four corner regions.

11. The reading device according to claim 10, wherein the four corner regions include a first corner region containing the first original corner, a second corner region containing the second original corner, a third corner region containing the third original corner, and a fourth corner region containing the fourth original corner, wherein the (c1) applying divides each of the first corner region, the second corner region, the third corner region, and the fourth corner region into the inside area and the outside area with the border having the rounded shape of the first original corner, the inside area of the first corner region being positioned on a same side as the second corner region with respect to the border, the outside area of the first corner region being positioned on an opposite side to the second corner region with respect to the border, the inside area of the second corner region being positioned on a same side as the first corner region with respect to the border, the outside area of the second corner region being positioned on an opposite side to the first corner region with respect to the border, the inside area of the third corner region being positioned on a same side as the fourth corner region with respect to the border, the outside area of the third corner region being positioned on an opposite side to the fourth corner region with respect to the border, the inside area of the fourth corner region being positioned on a same side as the third corner region with respect to the border, the outside area of the fourth corner region being positioned on an opposite side to the third corner region with respect to the border, and wherein the (c2) determining determines the original area by including the inside area determined for each of the first corner region, the second corner region, the third corner region, and the fourth corner region and excluding the outside area determined for each of the first corner region, the second corner region, the third corner region, and the fourth corner region.

12. The reading device according to claim 10, wherein the controller is configured to further perform:
(d) replacing image data corresponding to the outside area determined for each of the four corner regions with white data.

13. The reading device according to claim 8, wherein the four corner regions of the original image area include a first corner region containing the first original corner, a second corner region containing the second original corner, a third corner region containing the third original corner, and a fourth corner region containing the fourth original corner, and wherein the (c) determining determines the original area including the first corner region, the second corner region, the third corner region, and the fourth corner region when the (b) acquiring estimates that the rounded shape of the first original corner follows an elliptical shape.

14. The reading device according to claim 8, wherein when the (a) reading reads a first surface of the original and then reads a second surface of the original, both the (b) acquiring and the (c) determining are performed in response to reading the first surface, and the (b) acquiring is skipped and the (c) determining is performed in response to reading the second surface.

* * * * *

UNITED STATES PATENT AND TRADEMARK OFFICE
CERTIFICATE OF CORRECTION

PATENT NO. : 11,463,598 B2
APPLICATION NO. : 17/191110
DATED : October 4, 2022
INVENTOR(S) : Toshiki Motoyama Page 1 of 1

It is certified that error appears in the above-identified patent and that said Letters Patent is hereby corrected as shown below:

On the Title Page

Item [57], Line 10, change "a round shape" to --a rounded shape--.

In the Claims

Claim 1, Column 11, Line 36, change "round shape" to --rounded shape--.

Claim 4, Column 12, Line 6, change "a round" to --a rounded--.

Claim 7, Column 12, Line 32, change "a round" to --a rounded--.

Claim 8, Column 12, Line 66, change "a round" to --a rounded--.

Signed and Sealed this
Twenty-seventh Day of June, 2023

Katherine Kelly Vidal
*Director of the United States Patent and Trademark Office*